Figure 5:
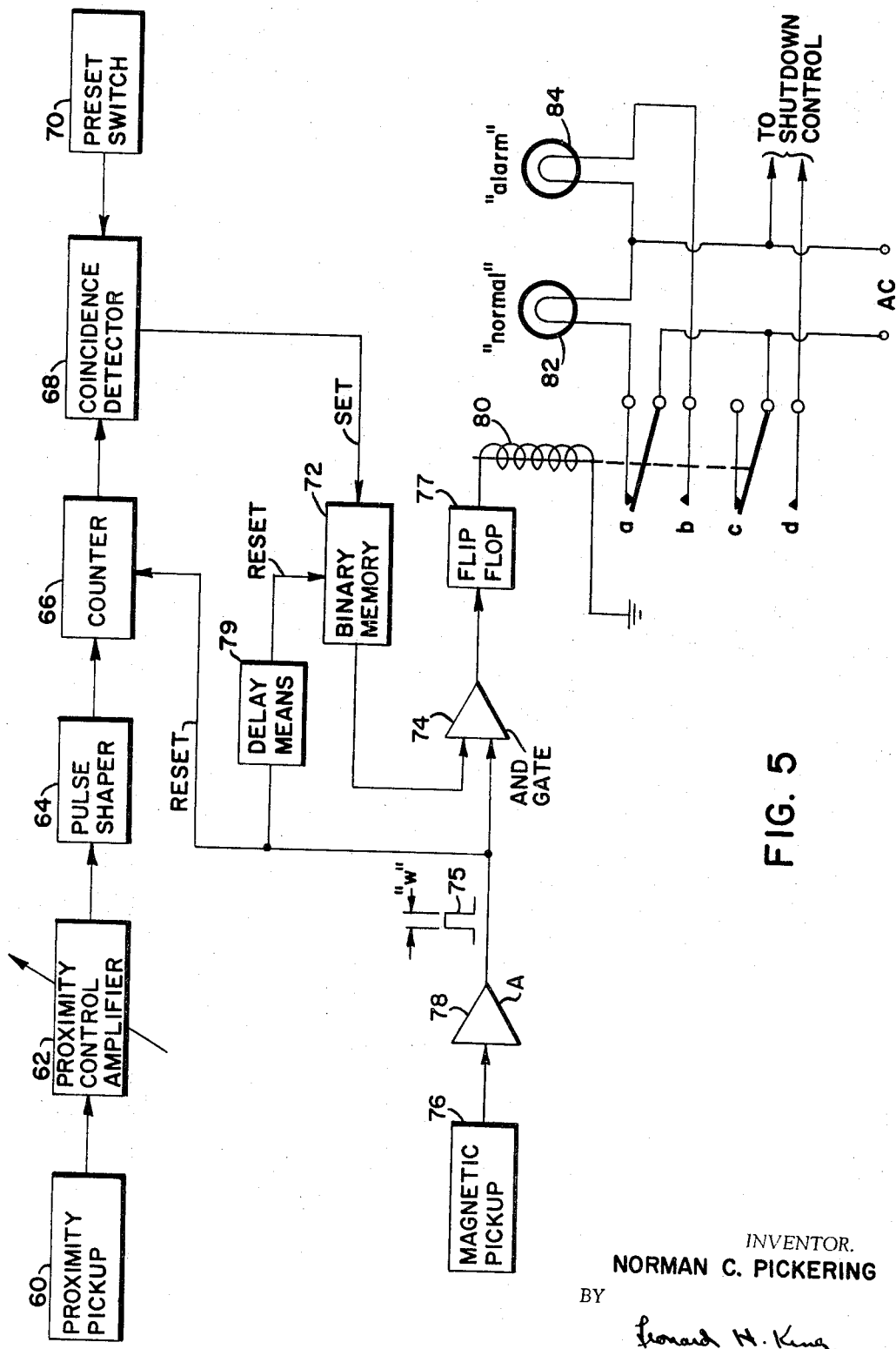

Oct. 10, 1967  N. C. PICKERING  3,345,812
STRAND BREAK DETECTOR
Filed Nov. 23, 1966  2 Sheets-Sheet 1
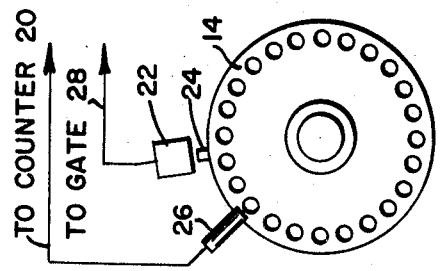
FIG. 2
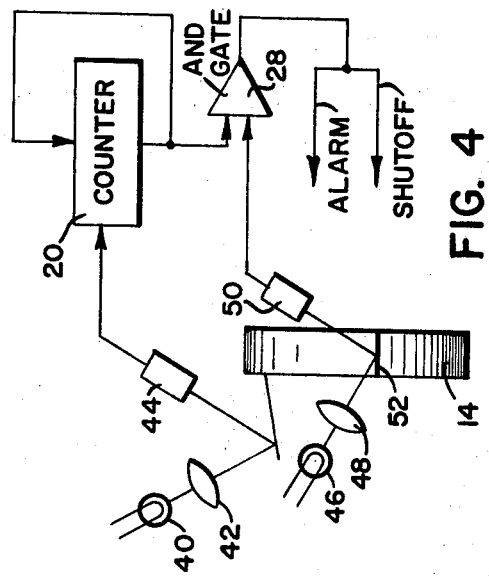
FIG. 4
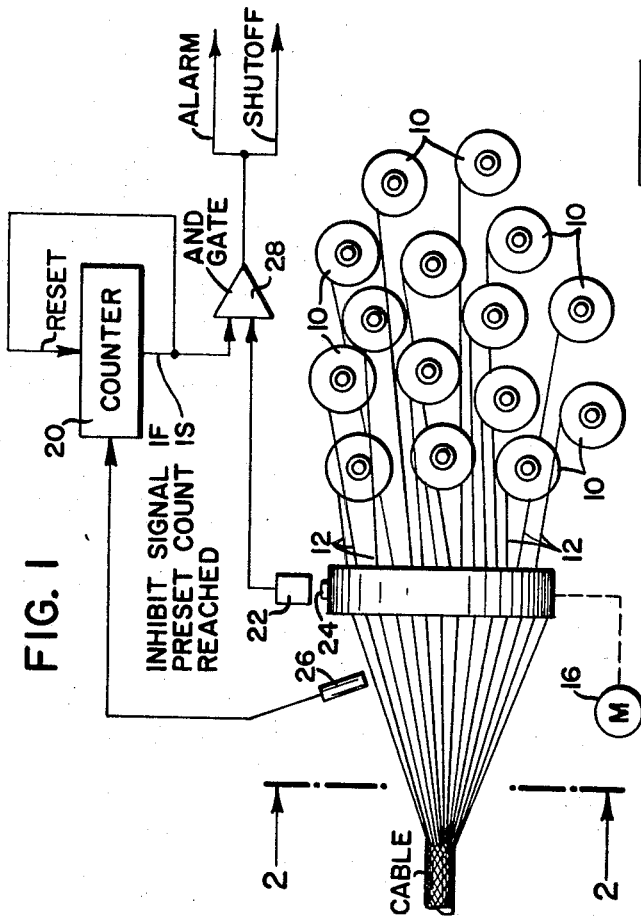
FIG. 1
FIG. 3
INVENTOR.
NORMAN C. PICKERING
BY
Leonard H. King
ATTORNEY

3,345,812
STRAND BREAK DETECTOR

Norman C. Pickering, Sag Harbor, N.Y., assignor, by mesne assignments, to General Time Corporation, Stamford, Conn.
Filed Nov. 23, 1966, Ser. No. 596,555
6 Claims. (Cl. 57—81)

This invention relates generally to filament-winding apparatus and more particularly to means for detecting a broken or missing strand during the winding operation.

As will be explained in detail hereinafter, the present invention provides very simple means for detecting a missing strand during the stranding of a cable. When a strand breaks, the apparatus will indicate that the required number of strands is not present and, in accordance with the user's option, an alarm, either audible or visible, will be actuated. Alternatively, the user may want the winding machine stopped when a missing strand indicates a break in the cable.

In winding the cable, the strands to be wound pass through a rotating head. The present invention utilizes sensing means capable of sensing the passage of a single filament past the sensing means as the head rotates. The sensing means provides a pulse for each passing filament strand. These pulses are then fed to a pulse counter of the preset type arranged to be actuated whenever the preset count is achieved. Actuation of the pulse counter output circuit is then used to control a gating circuit. As the winding head rotates, a second sensing means is employed to detect the position of a datum mark and then provide an output pulse on each passage thereof. This output pulse is fed into the gate. If the counter has received the prescribed number of pulses then the gate is placed in a closed condition and the pulse generated by the datum point is not transmitted. On the other hand, if one or more strands are missing then gate remains in a conducting condition and the pulse generated by the datum mark is transmitted through the gate where it can be used to actuate an alarm or to stop operation of the cable winder depending on the user's requirements.

The distinguishing characteristic of this invention is the simplicity with which this invention senses the individual strands of wire as they are rotated by the winding head. All of the embodiments have this basic feature. For example, in another embodiment a capacitive arrangement may be used wherein each strand represents a plate in a capacitor. A second fixed plate is placed in spaced relation to the strands so that the presence of a wire may be sensed. Again, a counter is used and where a strand is absent due to a break, the total count will be below the prescribed number. An alarm will be activated at that time only.

Still another embodiment utilizes a photocell arrangement to detect the presence of a strand. As in the previous embodiments, the information gathered is fed into a preset counter. Photoelectric means and a timing mark on the rotating winding head are also provided for automatically resetting the counter after each full revolution of the winding head.

It is to be understood that the scope of this invention includes any combination of embodiments described. It is also to be understood that even though the description is directed to metallic filaments and in particular to magnetic filaments, the teachings of this invention may be applied to nonmagnetic filaments as well, provided a suitable sensing element is employed.

Prior art devices in this field generally require complex structures that do not readily lend themselves to high speed, automatic winding equipment. Frequently, mechanical devices that actually touch the filament are employed. In other prior art devices a photoelectric system was used. The utility of this latter arrangement is limited in that an individual sensor is required for each filament. It is obvious that when the number of strands to be sensed are in the order of 100 per bundle, it is impractical, cumbersome and costly to require that many sensors. Another drawback of the prior art devices is that they are not readily adaptable to changes in the number of strands required for each application. By way of contrast, the present invention can sense, with equal facility, any number of strands within the capacity of the counter merely by dialing the correct number into the counter.

Accordingly, it is an object of this invention to provide improved means for detecting a break in one of the filaments of a multistranded bundle.

It is another object of this invention to provide a single sensing means for detecting a break in a multistranded bundle.

An additional object is to provide a system as described above, wherein the sensing means are not in physical contact with the strands.

A further object is to provide break-detecting means employing a strand counter that is automatically reset after each revolution of the winding apparatus.

A particular object is to provide a strand break-detector employing a proximity sensor.

A specific object is to provide a capacitance type of strand break-detector system.

Another specific object is to provide an optical type of strand break-detector system.

Still another object is to provide a strand break-detector system having control means responsive to pulse signals accumulated in a reset counter.

These and other features, objects and advantages of the invention will, in part, be pointed out with particularity and will, in part, become obvious from the following more detailed description of the invention, taken in conjunction with the accompanying drawing which forms an integral part thereof.

In the various figures of the drawing, like reference characters designate like parts.

In the drawing:
FIG. 1 is a schematic diagram of one embodiment of the system comprising this invention;
FIG. 2 is a schematic sectional view taken along line 2—2 of FIG. 1;
FIG. 3 is a schematic diagram of an alternative embodiment of this invention;
FIG. 4 is a schematic diagram of another alternative embodiment of this invention; and
FIG. 5 is a logic diagram.

FIG. 1 and FIG. 2 of the drawing illustrate the preferred form of this invention. For purposes of this description, there is schematically shown a conventional machine for winding a plurality of ferrous strands into a cable. A plurality of supply sources 10, for example, spools, deliver strands 12 to a winding head 14 that is arranged to be rotated by drive means 16. As the strands pass through the winding head, they are twisted or wrapped around a longitudinal axis. If desired, a core may be used to support the strands and external insulation may be added at a subsequent stage of operation.

In order to actuate the system, the operator first determines the number of strands in the cable. This number is manually set into a preset counter 20. In the embodiment illustrated, a two-digit counter is used so that a cable having up to 99 strands may be sensed. However, larger capacity counters are available and may be used. A magnetic pickup 22 is spaced from and in the same plane as the winding head in order to sense the revolution of a ferrous pin 24 that is rigidly secured to the perimeter of the winding head. The pickup and the pin provide reference means for resetting the counter.

A sensor 26 is mounted on a suitable bracket adjacent the strands as they leave the winding head. This sensor does not actually touch the strands but can operate up to ⅜ inch away depending upon the gage of the wire. Slight eccentricities and whip in the individual strands do not affect the accuracy of the detector. Pulses from the sensor 26 are stored in the counter 20 until the winding head makes one complete revolution. If at that time the number of strands equals the preselected number in the counter, then the counter automatically resets to zero and an inhibit signal is sent to a gate 28 to main the circuit to the alarm in a closed condition. Should a lesser number of strands be counted, thus indicating a break, the gate 28 remains open and the pulse from sensor 22 passes through the gate. The signal can be used for alarm and/or for machine-shutdown. Gate 28 is a simple logic circuit which, in combination with pickup 22 and pin 24, determines whether the preset number of strands has been counted before the reset signal occurs after each revolution of the winding head. A more detailed logic circuit will be described in conjunction with FIG. 5.

Alternative embodiments of the present invention are illustrated in FIG. 3 and in FIG. 4. The first of these embodiments utilizes a capacitance system wherein each wire strand 30 represents one of two spacedly opposed plates. The wire 30 electrically contacts the head 14; in turn, wiper 31 riding on the head is connected to the counter. The other plate 32 is fixed in position proximate the envelope defined by the wire strands. Each time a wire 30 passes plate 32, a pulse is sent to the preset counter. The remainder of this embodiment is the same as shown in FIG. 1. Since the strands are helically discharged from the rotating winding head, it is preferable that plate 32 be positioned at the same angle so that one wire at a time may be sensed.

The embodiment shown in FIG. 4 utilizes an optical system and is applicable to nonferrous strands. A lamp 40, a focusing lens 42 and a photoelectric cell 44 are used as the sensing means for counting the strands as they emerge from the winding head. Once again pulses are sent to the preset counter. In place of a magnetic pickup and pin, a lamp 46, a focusing lens 48 and a photoelectric cell 50 are used together with a timing mark 52 applied to the periphery of the winding head. Thus, each revolution of the winding head is accurately sensed.

Thus it will be appreciated that the sensing device may be any one of the sensing devices known to the art which is suitable for this purpose whether it be a proximity sensor, magnetic pickup, photoelectric means, etc.

FIG. 5 discloses in greater detail the logic of a practical system. Proximity pickup 60 provides a signal to a proximity control amplifier 62 which permits adjustment of the pickup sensitivity to accommodate a particular installation. The output of amplifier 62 is fed to a pulse shaper 64 whose function is to provide fast rise-time pulses. These pulses are then fed to a binary arithmetic counting module 66, the output of which is fed to a coincidence detector 68. The output of preset switches 70 are likewise fed to coincidence detector 68. When the number of pulses accumulated by counter 66 close the setting on the preset switches, the coincidence detector provides an output signal which sets a binary memory element 72. The output of this binary memory element is used to close an AND gate 74. The closure of this gate 74 prevents the signal pulse 75 from magnetic pickup 76 (and its associated signal amplifier 78) from passing through gate 74 to flip-flop 77. Flip-flop 77 latches relay 80. However, the pulse is used to reset counter 66 to zero and to reset element 72 after a delay of a time greater than the duration "W" of pulse 75. Delay means 79 provides the requisite delay. If, however, coincidence is not reached (indicating a wire strand break), the signal from magnetic pickup is permitted to pass through AND gate 74 to flip-flop 77 to actuate relay 80 which in turn de-energizes the switch contact A which feeds "normal" light 82 and energize contacts B and D to energize "alarm" lamp 84 and to energize a shutdown control or provide other control function.

The apparatus described hereinabove provides simple means for detecting a broken strand in a cable and is equally adaptable to ferrous and nonferrous filaments. The equipment may be used as an attachment for existing winding machines with a minimum of installation and maintenance time required. Each of the embodiments provides structure that continuously senses the cable while it is being wound so that a flow will be detected within the time required for only one revolution of the winding head. As pointed out above, the sensing apparatus does not physically contact the filaments. At the user's option, the signal produced by the control gate may be used as an alarm or machine shutoff.

Having thus disclosed the best embodiment of the invention presently contemplated, it is to be understood that various changes and modifications may be made by those skilled in the art without departing from the spirit of the invention.

What is claimed is:

1. Apparatus for use with a winding machine having a rotating winding head, said apparatus being adapted to detect a broken strand in a multistranded cable, said apparatus comprising in combination:
    (a) sensing means to detect the presence of and to emit a pulse for each individual strand passing said sensing means;
    (b) timing means to indicate one complete revolution of the winding head;
    (c) counting means responsive to said sensing means and arranged to add the pulses emitted by said sensing means, said counting means having a preset upper limit of pulses equal to the number of strands in the cable and means to emit a control pulse when said preset upper limit is reached and means to reset itself to zero after each revolution of the winding head; and
    (d) control means coupled to said timing means and said counting means, for receiving said control pulse, said control means being arranged to complete the circuit to a utilization device when, after one revolution of the winding head, the number of pulses in said counting means is less than the preset upper limit of pulses.

2. The apparatus in accordance with claim 1 wherein said sensing means is a proximity detector.

3. The apparatus in accordance with claim 1 wherein said timing means comprises a magnetizable pin secured to the periphery of the winding head and a magnetic pickup mounted opposite thereto.

4. The apparatus in accordance with claim 1 wherein said sensing means is comprised of a plate coupled to said counting means, said plate being in opposition to the path of the strands as they emerge from the winding head, the strands being metallic.

5. The apparatus in accordance with claim 1 wherein said sensing means comprises a lamp, a focusing lens and a photoelectric cell, said cell being coupled to said counting means.

6. The apparatus in accordance with claim 1 wherein said timing means comprises a lamp, a focusing lens and a photoelectric cell, said cell being coupled to said control means, there being further included a timing mark on the periphery of the winding head.

References Cited

UNITED STATES PATENTS

| | | | |
|---|---|---|---|
| 2,352,647 | 7/1944 | Linsenmeyer et al. | 57—81 |
| 2,361,509 | 10/1944 | Steuber | 57—81 |
| 2,440,185 | 4/1948 | Prosser et al. | 57—81 |
| 2,593,984 | 4/1952 | Clary et al. | 57—81 X |
| 2,594,741 | 4/1952 | Dexter | 57—19 X |
| 3,035,394 | 5/1962 | Wahl | 57—19 |
| 3,287,887 | 11/1966 | Dornberger | 57—19 |

FRANK J. COHEN, *Primary Examiner.*

J. PETRAKES, *Assistant Examiner.*